Patented Jan. 10, 1933

1,893,873

UNITED STATES PATENT OFFICE

ROY H. KIENLE, OF SCHENECTADY, NEW YORK, ASSIGNOR TO GENERAL ELECTRIC COMPANY, A CORPORATION OF NEW YORK

RESINOUS CONDENSATION PRODUCTS AND PROCESS OF MAKING THEM

No Drawing. Application filed January 29, 1927. Serial No. 164,662.

The present invention relates to artificial resins of the condensed ester type and comprises an improved resinous composition which contains in a combined state oxidizable, unsaturated fatty acid, for example, such acids as may be derived from drying oils.

It is the object of my invention to produce resins of the polyhydric alcohol-polybasic acid class which can be fully hardened or set at ordinary room temperatures, that is, without baking, which shall have greater hardness and elasticity and in general have more advantageous physical properties for industrial purposes than alkyd resins which have been produced heretofore. Alkyd resins, as is known, include the complexes resulting from the reaction of polyhydric alcohols and resinifying carboxylic organic acids such as the polybasic acids or their anhydrides.

Arsem U. S. Patent 1,098,776 of June 2, 1914 describes the preparation of alkyd resins from a polyhydric alcohol, such as glycerine, and a cyclic polybasic acid, such as phthalic acid, together with an aliphatic acid. Included among the aliphatic acids are fatty acids, such as stearic and oleic acids. These fatty acids are of the non-drying type, that is, they are not hardened by oxidation.

I have discovered that when an aromatic or cyclic polybasic acid, such as phthalic acid, is associated with an unsaturated, oxidizable acid, namely an acid derived from a drying oil, such, for example, as eleostearic, linolic, or linolenic acid, such acids having more than one double bond in the molecule, that then a new form of resinous material is produced which differs in many important respects from the resin containing a non-drying fatty acid. For example, such a resin is soluble at ordinary temperatures in a drying oil. The resin containing such acid is convertible by contact with the air at ordinary temperatures to a hard, tough state. When applied in solution on metal or other foundation material a tough, flexible and tenaceously adherent film is formed upon evaporation of the solvent and air drying. All these properties render this resin valuable as an ingredient in varnishes or other protective coatings.

The following specific examples are given to illustrate the manner of carrying out my invention and the character of the products derived therefrom.

*First example.*—About 92 parts by weight of glycerine and 296 parts by weight of phthalic anhydride are heated with the temperature gradually rising. At about 160° C. a clear, straw-colored solution is produced. The temperature is gradually increased to about 200° C. to cause a reaction to proceed, water vapor and some anhydride being given off. At this point an additional quantity of phthalic anhydride may be added,—say about 74 parts by weight, and also about 140 parts of one or more fatty acids derived from a drying oil, such as China wood, linseed, or perilla oil. Heating is continued at a temperature within the range of 190° C. to 210° C. until frothing and the giving off of vapors ceases and a clear liquid is formed. Instead of the mixed acids derived from a drying oil, which include also as minor constituents non-oxidizable fatty acids, I may use one or more oxidizable, unsaturated acids, such as eleostearic, linolic or linolenic acids unassociated with other fatty acids.

*Second example.*—The cyclic or aromatic acid may be mixed with the aliphatic acid and reaction then may be carried out in one stage by the addition of glycerine. By weight, about 370 parts of phthalic anhydride and about 140 parts of the fatty acids derived from one of the drying oils are melted by heating to about 160° C. About 92 parts of glycerine then are added and the temperature is raised to about 200° C. until resinification occurs. I prefer to heat the mixture until a resin is formed which strings out at about 180° C. when allowed to fall in drops.

A resin prepared by either method is more flexible and tougher than a resin derived from glycerine and phthalic anhydride alone, unassociated with the acid derived from a drying oil.

The resins made in accordance with my invention are soluble in acetone, alcohol-benzol, coal tar oil, acetone oil, butyl acetate, butyl alcohol, ethyl lactate, glycol diacetate, glycol, glycol derivatives such as the monoethyl ether, benzyl acetate, phthalate esters such as diethyl phthalate, triacetin.

When such resin dissolved in a suitable solvent of the types mentioned above is applied as a varnish, a tough, tenaceously adherent film is produced upon evaporation of the solvent and air drying of the resin. Upon air drying the resin becomes not only hardened but also non-fusible and insoluble in ordinary organic solvents. Such a film is particularly advantageous for coating metals because of its adherence.

The resin also may be utilized in massive or bulk form, for example, by casting the fused resin into suitable mold to produce slabs, sheets or ingots, which may be heat hardened, if desired.

The resin also may be used in conjunction with various fillers for the preparation of molded products, or as a cement or as a binder for laminated materials, or as an impregnant for porous materials.

The resins made in accordance with my invention are miscible directly by simple heating with drying oils, such as linseed oil, China wood oil, perilla oil, or blown fish oil. Such solutions are useful as a varnish for coating metals, wood or other articles.

It will be obvious that the resins made in accordance with my invention will yield on saponification the alcohols and acids from which they are formed.

Obviously the appended claims, except where otherwise specifically limited, are intended to cover the products and processes whether obtained or practiced by multi-stage operations as illustrated in Example 1, or by a one-stage operation as illustrated in Example 2 hereinabove.

What I claim as new and desire to secure by Letters Patent of the United States, is,—

1. A resinous composition constituted by the reaction product of a polyhydric alcohol, a polybasic aromatic acid and air drying fatty acid.

2. A resinous composition constituted by the reaction product of a polyhydric alcohol, a polybasic aromatic acid and mixed fatty acids derived from China wood oil.

3. A resinous composition constituted by the reaction product of a polyhydric alcohol, a polybasic aromatic acid and fatty acids derived from linseed oil.

4. A resinous composition constituted by the condensation product of glycerine, phthalic anhydride and an oxidizable unsaturated fatty acid having more than one double bond in the molecule.

5. A resin constituted by the reaction product of a polyhydric alcohol, a polybasic organic acid and the mixed fatty acids derived from a drying oil.

6. A resin constituted by the reaction product of a polyhydric alcohol, a polybasic organic acid and oily material comprising a fatty acid radical of a drying oil.

7. A resinous material comprising the reaction product of a polyhydric alcohol, a resinifying carboxylic organic acid and a fatty acid derived from an oil having drying properties.

8. A resinous composition produced by the reaction of about 92 parts of glycerine, about 370 parts of phthalic anhydride and about 140 parts of mixed fatty acid derived from a drying oil, said parts being by weight.

9. A fusible soluble polyhydric alcohol polybasic acid resin which is capable of being converted to the infusible, insoluble state by oxidation and which contains an acid radical of a drying oil in chemical combination.

10. A fusible soluble polyhydric alcohol-polybasic acid resin which is capable of being converted to the infusible insoluble state by oxidization, and which contains a radical of an air drying fatty acid in chemical combination.

11. A fusible soluble polyhydric alcohol-polybasic acid resin which is capable of being converted to the infusible insoluble state by oxidization, and which contains a fatty acid radical of linseed oil in chemical combination.

12. A fusible soluble polyhydric alcohol-polybasic acid resin which is capable of being converted to the infusible insoluble state by oxidization, and which contains a radical of an oxidizable unsaturated fatty acid having more than one double bond in the molecule in chemical combination.

13. The process of making an air drying fusible, soluble, resinous composition which consists in reacting upon a polyhydric alcohol with a polybasic organic acid and fatty acid derived from a drying oil.

14. The process of making an air drying fusible soluble resinous composition which consists in reacting upon a polyhydric alcohol with a polybasic organic acid and air drying fatty acid.

15. The process of making an air drying fusible soluble resinous composition which consists in reacting upon a polyhydric alcohol with a polybasic organic acid and fatty acids derived from linseed oil.

16. The process of making an air drying fusible soluble resinous composition which consists in reacting upon a polyhydric alcohol with a polybasic organic acid and an oxidizable unsaturated fatty acid having more than one double bond in the molecule.

17. The process of making a varnish resin which consists in reacting a mixture of glycerine, phthalic anhydride and fatty acid derived from a drying oil.

18. The process of making a resin which comprises reacting a mixture of glycerine, phthalic anhydride and air drying fatty acid.

19. The process of making a resin which comprises reacting a mixture of glycerine, phthalic anhydride and fatty acids derived from linseed oil.

20. The process of making a resin which comprises reacting a mixture of glycerine, phthalic anhydride and oxidizable unsaturated fatty acid having more than one double bond in the molecule.

21. The process of making a varnish resin which consists in heating to a reaction temperature a mixture comprising by weight about 92 parts of glycerine, about 370 parts of phthalic anhydride and about 140 parts of fatty acid derived from drying oil and discontinuing the heating when resinification has occurred.

22. A product soluble in various mixed organic solvents and comprising a resinous reaction product of a polyhydric alcohol, a resinifying carboxylic organic acid and a drying oil acid more unsaturated than oleic acid.

23. A product soluble in various mixed organic solvents comprising resinified glycerides of a resinifying carboxylic organic acid and an oily fatty acid comprising an acid more unsaturated than oleic acid.

24. The process of making a resinous product soluble in various mixed organic solvents which comprises heating to reaction temperature a mass comprising a polyhydric alcohol, a resinifying carboxylic organic acid and a drying oil acid more unsaturated than oleic acid.

25. The process of making a resinous product soluble in various mixed organic solvents which comprises heating to reaction temperature a mass comprising glycerol, a resinifying carboxylic organic acid and an oily fatty acid more unsaturated than oleic acid.

26. A new composition of matter having the property of hardening by absorption of oxygen at atmospheric temperature and comprising a polyhydric alcohol-polybasic acid ester containing a fatty acid radical of an oil having drying properties.

27. The process of producing a synthetic resin which comprises heating to reaction temperature a reaction mass containing glycerol, phthalic acid and linseed oil acid.

28. The process of producing a synthetic resin which comprises heating to reaction temperature a reaction mass containing a polyhydric alcohol, a polybasic organic acid and acids obtainable by hydrolyzing a drying oil.

29. The process of producing a synthetic resin which comprises heating to reaction temperature a reaction mass containing a polyhydric alcohol, a resinifying carboxylic acid and acids obtainable by hydrolyzing a drying oil.

30. The process of producing a synthetic resin which comprises heating to a temperature of 160°–210° C. a reaction mixture containing a polyhydric alcohol, a polybasic organic acid and acids obtainable by hydrolyzing a drying oil.

31. A new composition of matter comprising essentially a mixed ester in which the alcohol radical is that of a polyhydric alcohol and the acid radicals are those of a polybasic organic acid and acids obtainable by hydrolyzing a drying oil.

32. A new composition of matter comprising essentially a mixed ester of glycerol, phthalic acid and linseed oil acid.

33. A coating composition comprising a mixed ester and a solvent therefor, said mixed ester having as the alcohol component a polyhydric alcohol, and as the acid components a polybasic organic acid and acids obtainable by the hydrolysis of drying oil.

34. A coating composition comprising a mixed ester of glycerin and a solvent therefor, said mixed ester having as the acid components phthalic acid and acids obtainable by the hydrolysis of drying oil.

35. A coating composition comprising a mixed ester of glycerin and a solvent therefor, said mixed ester having as the acid components phthalic acid and acids obtainable by the hydrolysis of China wood oil.

36. A coating composition comprising a mixed ester of glycerin and a solvent therefor, said mixed ester having as the acid components phthalic acid and acids obtainable by the hydrolysis of China wood oil and linseed oil.

37. A resinous product which on saponification yields a polyhydric alcohol, a resinifying carboxylic organic acid, and a drying oil acid.

38. A resinous product which on saponification yields a polyhydric alcohol, a polybasic organic acid, and a drying oil acid.

39. A resinous product which on saponification yields a polyhydric alcohol, a polybasic organic acid, and drying oil acids comprising linseed oil acids.

40. A resinous product which on saponification yields a polyhydric alcohol, a polybasic organic acid, and drying oil acids comprising China wood oil acids.

41. A resinous product which on saponification yields glycerol, phthalic acid, and drying oil acids.

In witness whereof, I have hereunto set my hand this 27th day of January, 1927.

ROY H. KIENLE.